S. H. MUSGRAVE.
CLOD CRUSHER.
APPLICATION FILED MAR. 15, 1918. RENEWED OCT. 30, 1919.
1,338,391.
Patented Apr. 27, 1920.
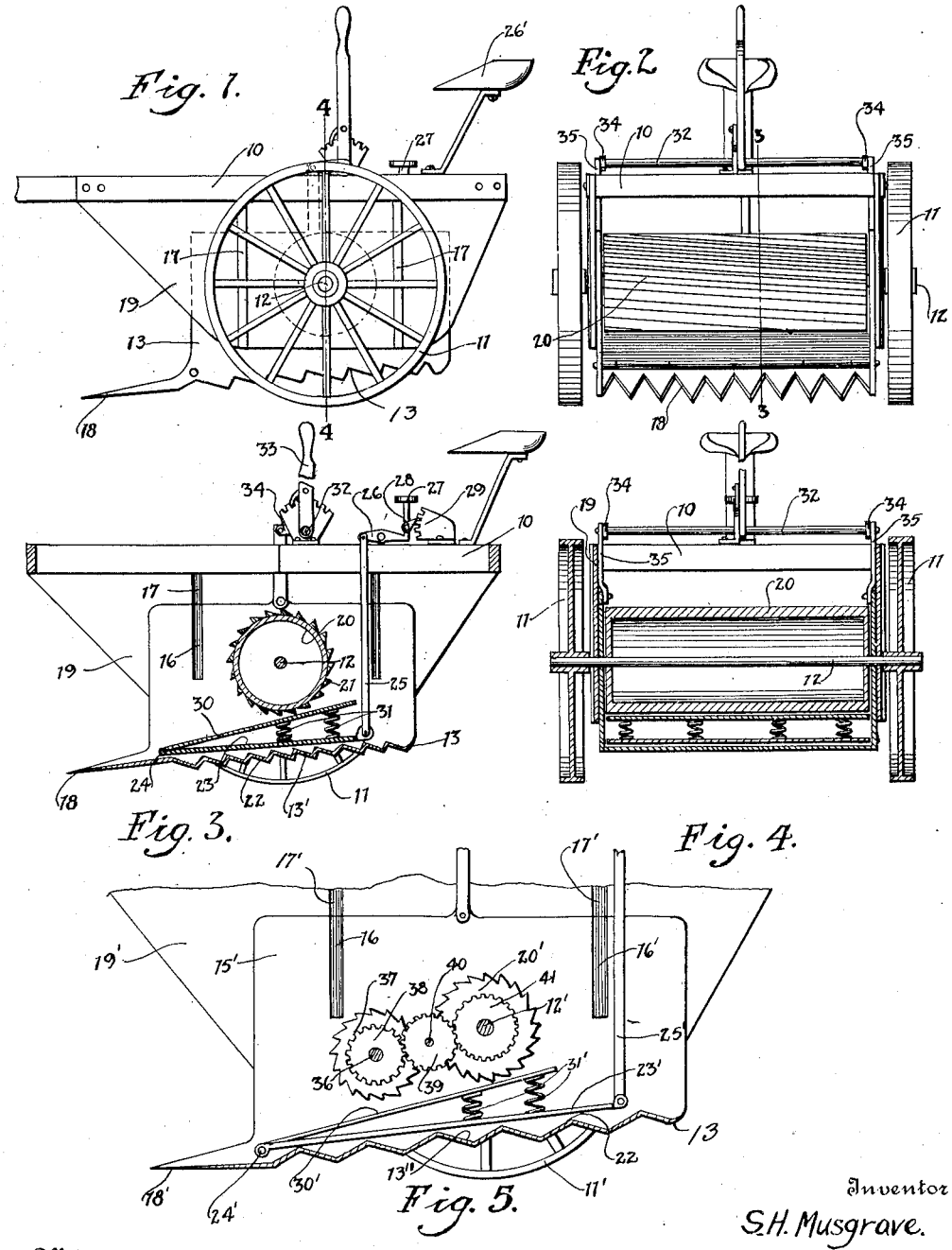

UNITED STATES PATENT OFFICE.

SAMUEL H. MUSGRAVE, OF OCEAN FALLS, BRITISH COLUMBIA, CANADA.

CLOD-CRUSHER.

1,338,391. Specification of Letters Patent. Patented Apr. 27, 1920.

Application filed March 15, 1918, Serial No. 222,780. Renewed October 30, 1919. Serial No. 334,633.

*To all whom it may concern:*

Be it known that I, SAMUEL H. MUSGRAVE, a citizen of Canada, residing at Ocean Falls, in the Province of British Columbia, Dominion of Canada, have invented certain new and useful Improvements in Clod-Crushers; and I do hereby declare the following to be a full, clear, and exact description of the invention, such as will enable others skilled in the art to which it appertains to make and use the same.

This invention relates to improvements in agricultural machines and particularly to soil pulverizing machines.

One object of the present invention is to provide a novel and improved device of this character which is capable of being drawn over the ground and which will dig up the soil and crush and pulverize the large lumps.

Another object is to provide a novel and improved device of this character which is capable of adjustment to regulate the depth to which the digging element enters the soil and the degree of pulverization of the soil.

Other objects and advantages will be apparent from the following description when taken in connection with the accompanying drawing.

In the drawing:

Figure 1 is a side elevation of a soil pulverizing machine made in accordance with my invention.

Fig. 2 is a front elevation of the same.

Fig. 3 is a vertical longitudinal sectional view taken on the line 3—3 of Fig. 2.

Fig. 4 is a vertical transverse sectional view taken on the line 4—4 of Fig. 1.

Fig. 5 is a fragmentary sectional view, similar to Fig. 3, showing a modification of the device.

Referring particularly to the accompanying drawing, 10 represents a horizontal frame which is supported by the ground engaging wheels 11, said wheels being mounted on the axle 12, carried by the frame. Rigidly secured on the axle and rotatable therewith is a drum 20, which will be referred to more particularly hereinafter. A yoke plate 13 is disposed below the frame and has its arms or side portions 15 provided with vertical ribs 16 for reception, slidably, in the vertical grooves 17 formed in the depending side members 19 of the frame 10. The transverse portion 13' of the yoke plate has its forward edge slightly projected forwardly and formed with the teeth 18 which are arranged to dig into the soil and lift the same onto the portion 13' and pass thereover and drop to the ground from the rear edge thereof, in pulverized condition, as will appear later herein.

The face of the drum is provided with the parallel and spirally arranged ribs 21. The portion 13' is upwardly and rearwardly inclined and formed with the transverse corrugations 22 which are adapted to crush, by passing thereover, the clods which fail to pass over the said portion 13'. A plate 23 is disposed over the member 13' and is pivoted at its forward end at 24. The rear end of the plate has pivotally connected thereto the lower end of a vertical link 25, the upper end of which is pivotally connected to the forward end of the centrally pivoted rock arm 26 carried by the frame 10 and disposed adjacent the driver's seat 26'. The other end of the arm carries a rigidly connected vertical stem 27 forming the foot pedal for depression by the foot of the driver. Carried by the pedal is a pivoted pawl 28 which engages with a toothed segment 29, mounted adjacent thereto, for the purpose of holding the pedal depressed and the plate 23 at different distances from the corrugated member 13'. Pivotally connected to the forward end of the plate 23 is a second plate 30 the same being held upwardly by the springs 31, against the drum. Thus when the pedal is depressed the plate 23 will be lifted and force the plate 30 against the drum, by the force of the springs, whereby said plate 30 will be yieldably urged and permitted to move away from the drum as ths clods pass between the drum and said plate. Different degrees of pressure can be gotten between the drum and the plate 30 to properly crush the clods of soil dug up by the teeth 18, while the plate 30 is permitted to yield and move away from the drum to permit stones or other hard objects to pass therebetween without injury to the machine.

Secured centrally to a transverse shaft 32, carried by the frame 10, is a vertical lever 33, the ends of said shaft being provided with the forwardly extending arms 34, to which are pivotally connected the upper ends of the links 35. The lower ends of these links are pivotally connected to the upper edges of the side members of the yoke 13, whereby upon movement of said lever the yoke will be elevated or lowered as desired to regulate the depth into the soil that the teeth 18 will dig.

In Fig. 5 there is shown a modification of the device in which two crushing rollers or drums are used. The remainder of the construction is the same as that of the form already described.

In the form shown in Fig. 5, the drum 20' is mounted on the axle 12' in the same manner as that of the first form. Mounted rotatably in the side members 15', of the yoke 13 and forwardly of the axle, is a transverse shaft 36, on which is mounted a second drum 37, of slightly smaller diameter than the drum 20'. This shaft also carries fixed thereon the pinions 38 which mesh with the pinions 39 carried by the stub shafts which are carried by the members 15', as shown at 40. These pinions 39 also mesh with pinions 41 on the end portions of the axle 12', whereby when the ground wheels 11' rotate the two drums will be rotated in the same direction. Thus the clods which are not entirely crushed between the drum 37 and the plate 30', will be fully crushed between the drum 20' and the rear portion of the plate. Thus it is arranged that complete and effective pulverization of the soil shall be accomplished, the powdered soil passing from the rear end of the member 13'', as will be clearly understood. The side portions 19' of the frame 10 have the grooves 16' for the reception of the ribs 17' of the side members of the yoke 13'.

What is claimed is:

1. A soil pulverizing machine including a frame having an axle and wheels carried thereby, a yoke member vertically adjustable within and depending below the frame, said yoke having a forwardly disposed serrated soil digging and lifting portion, a crushing drum carried by the axle within the yoke, and yieldably supported means carried by the yoke for coöperation with the drum to crush the clods.

2. A soil pulverizing machine including a wheeled frame, a vertically adjustable yoke carried by the frame and formed with a soil digging and lifting portion, a yieldably supported plate carried by the yoke, an adjustable and pivoted plate mounted below the first plate, and a crushing drum rotatable with the wheels of the frame and coöperating with the first plate.

In testimony whereof, I affix my signature in the presence of two witnesses.

SAMUEL H. MUSGRAVE.

Witnesses:
  CHRISTINA MUSGRAVE,
  MAUDI E. CLARKE.